Aug. 20, 1935.  W. H. MYERS  2,011,940
BRAKE DRUM TRUING DEVICE
Filed Feb. 24, 1931  3 Sheets-Sheet 1
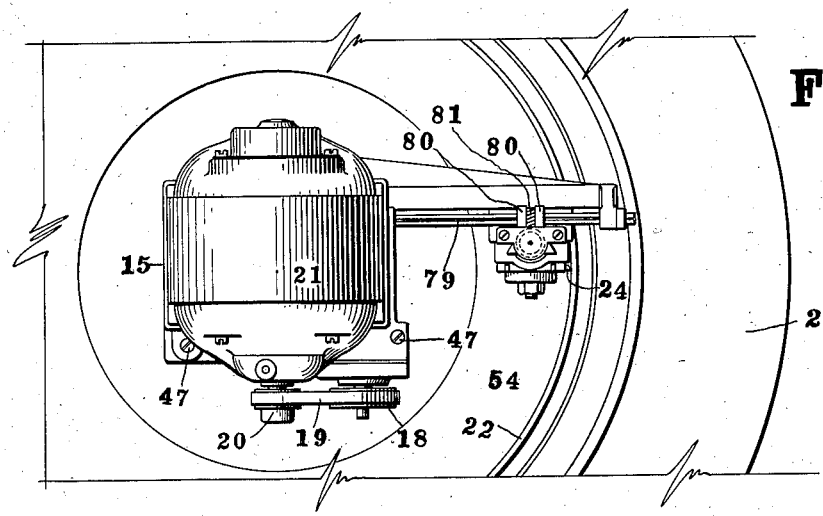
Fig.2.
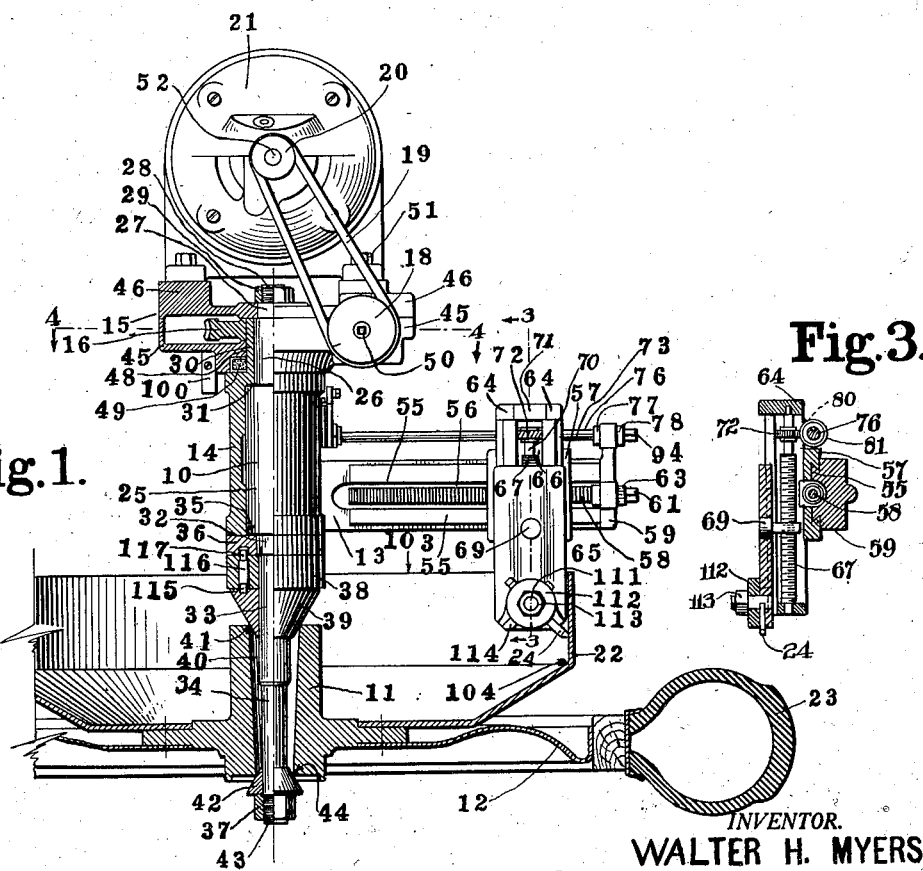
Fig.1.
Fig.3.
INVENTOR.
WALTER H. MYERS
BY
*Leonard L. Kalish*
ATTORNEY.

Aug. 20, 1935.     W. H. MYERS     2,011,940
BRAKE DRUM TRUING DEVICE
Filed Feb. 24, 1931     3 Sheets-Sheet 2
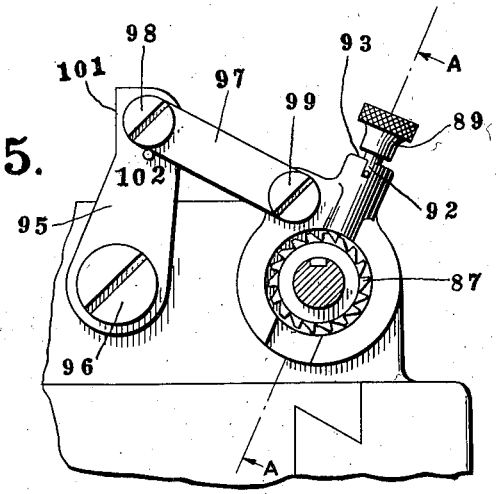
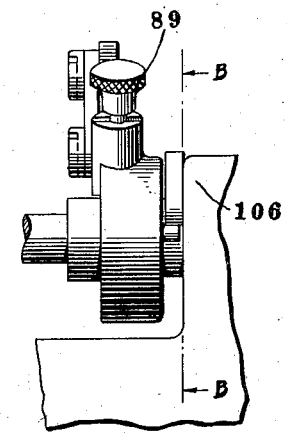
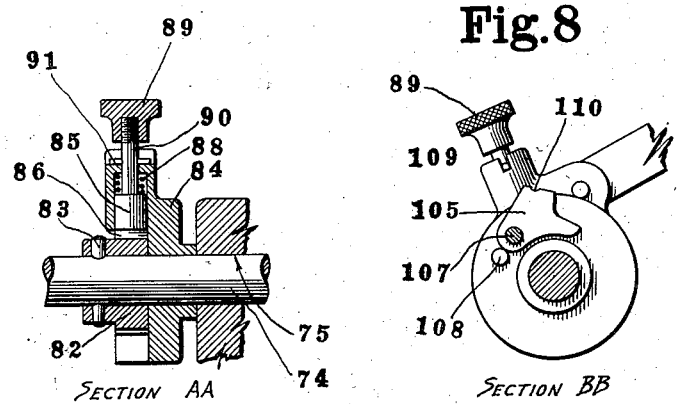
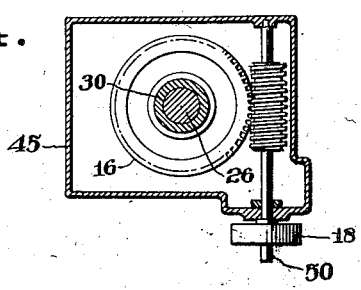
INVENTOR.
WALTER H. MYERS
BY
ATTORNEY.

Aug. 20, 1935.  W. H. MYERS  2,011,940
BRAKE DRUM TRUING DEVICE
Filed Feb. 24, 1931  3 Sheets-Sheet 3

INVENTOR.
WALTER H. MYERS
BY
ATTORNEY.

Patented Aug. 20, 1935

2,011,940

UNITED STATES PATENT OFFICE 2,011,940

BRAKE DRUM TRUING DEVICE

Walter H. Myers, Philadelphia, Pa.

Application February 24, 1931, Serial No. 517,656

10 Claims. (Cl. 82—4)

My invention relates to a new and useful brake drum truing machine, and it relates more particularly to a brake drum truing machine of the portable type, which is adapted to be attached to the hub of a wheel (the wheel having been removed from the automobile) in axial relation thereto.

The brake drums of automobile wheels develop slight irregularities on their effective cylindrical surfaces, with the result that the brake shoe or brake band does not grip uniformly. To overcome this defect of the brake, it is necessary to re-surface or to true up the brake drum to a smooth cylindrical surface coaxial with respect to the wheel. This truing up, or re-surfacing of the brake drum is effected generally by cutting or "turning" a suitable amount of the metal from the effective brake surface, until all irregularities in said surface are removed. Both stationary or lathe type of machines, as well as portable type of machines have been devised especially for truing brake drums.

The object of my present invention is a portable brake drum truing machine which is of simple construction, positive in action and which will be sufficiently rigid to permit a fairly rapid operation thereof without any resultant vibration or "chatter".

With the above and other objects in view, which will appear more fully from the following detailed description, my invention consists of a supporting post adapted to be adjustably fastened into the hub of the wheel in an axial position, and adapted to support a freely rotating, generally radial arm and carrying at its upper end a stationary gear housing within which a worm and gear, or other suitable reducing gearing is suitably housed;—said worm or other driving pinion being directly connected to an electric motor mounted on top of said gear housing (through any suitable belt or other means) and said worm gear or other final driven gear being keyed directly to the freely rotating sleeve which surrounds the axial post and which carries the generally radial tool arm.

My invention further consists of other novel features of construction which will be outlined more fully hereinafter.

For the purpose of illustrating my invention, I have shown in the accompanying drawings forms thereof which are at present preferred by me, since the same have been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawings in which like reference characters indicate like parts:

Figure 1 represents a vertical elevational view, partly in section, of the brake drum truing machine embodying my invention (the wheel and brake drum being partly broken away).

Figure 2 represents a top plan view of the same (with the wheel and brake drum being similarly broken away in part).

Figure 3 represents a section on line 3—3 of Figure 1.

Figure 4 represents a section on line 4—4 of the stationary gear housing taken on line 4—4 of Figure 1.

Figure 5 represents a side elevation on an enlarged scale, of the ratchet feed mechanism.

Figure 6 represents a view of the ratchet feeding mechanism, taken at 90 degrees to the view shown in Figure 5.

Figure 7 represents a section on line A—A of Figure 5.

Figure 8 represents a section on line B—B of Figure 6.

Figure 9:
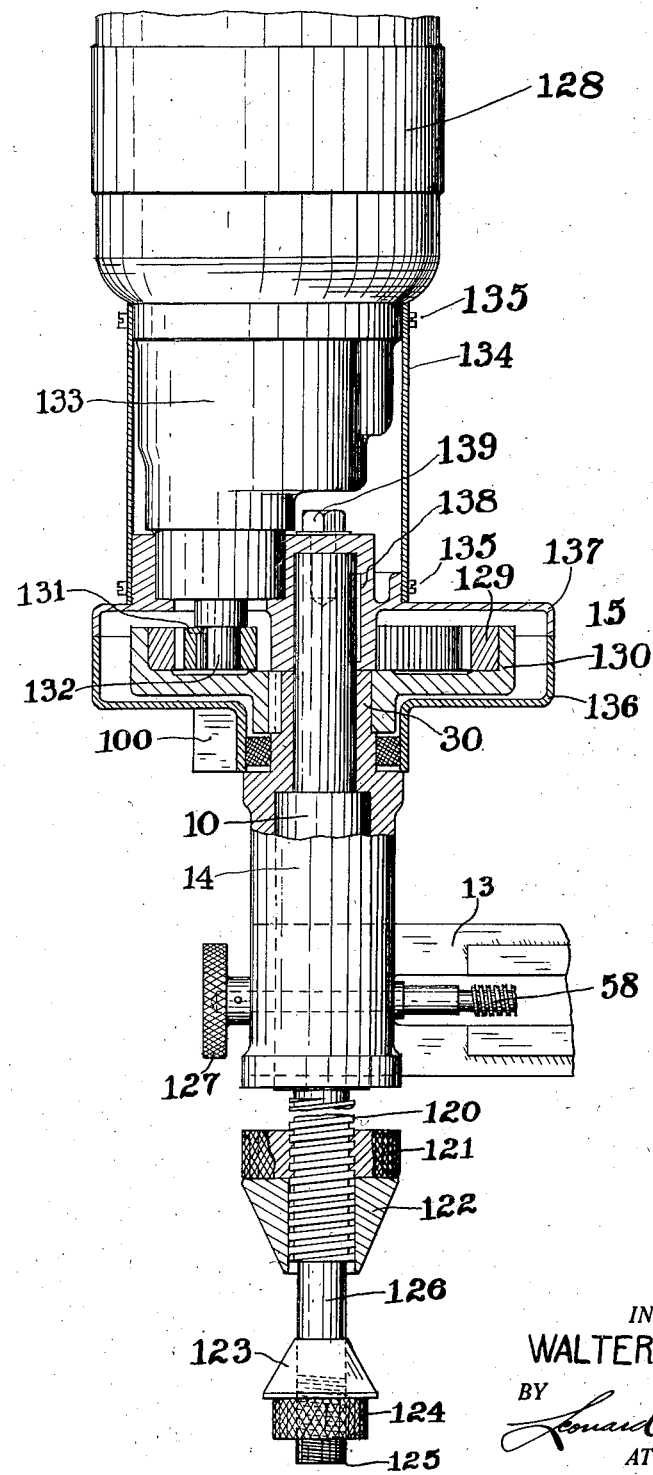
Figure 9 represents a front elevation, partly in vertical section, of a modified construction embodying my invention, particularly with respect to the power transmission from the electric motor to the tool arm sleeve and with respect to the vertical height adjustment of the supporting post within the hub of the wheel.

The brake drum truing machine of the present invention may be analyzed into three main parts, to wit, the supporting post 10, which is adapted to be secured axially in the hub 11, of the wheel 12;—the generally radial tool arm 13 which is rotatably mounted upon the post 10 through the medium of the sleeve 14 journalled upon said post, and lastly, the stationary gear housing 15 stationarily mounted upon the upper end of the post 10 and carrying within it the worm gear 16, keyed to an upper extension of the sleeve 14, and a worm 17 enmeshed with said worm gear 16, which is rotated or driven through a pulley 18, which in turn is driven through the belt 19 and pulley 20, by the electric motor 21, mounted on top of the gear housing 15.

The automobile wheel and brake drum illustrated particularly in Figures 1 and 2 (in a fragmentary manner) may be any type and construction of wheel. The brake drum is designated by the numeral 22, while the tire is designated by the numeral 23.

The supporting post 10 is extended through the hub 11 of the wheel 12, and is axially secured to said hub and serves as the support both for the rotary tool arm 13, as well as for the stationary driving mechanism, including the gear housing 15, and the electric motor 21.

The generally radial tool arm 13 is formed integrally with the sleeve 14, and is preferably a cast iron or cast steel member. The arm 13 is preferably tangential with respect to the sleeve 14, so that the tool point 24 carried by said tool arm 13, may be positioned in a plane in which the axis of the tool post 10 lies, so that the tool 24 may always be disposed in true radial relation to the axis of rotation.

The supporting post 10 is provided with varying diameter, concentric or coaxial portions. Thus, the upper journal portion 25 is of the greatest diameter, sufficiently large to afford a suitable bearing surface for the rotary sleeve 14 of the tool arm 13. Above the portion 25, is a somewhat reduced diameter portion 26, and above it is a portion 27 of a further reduced diameter;— the upper part of the supporting post 10 terminating in the screw threaded portion 28 which is adapted to receive the nut 29.

The rotary sleeve 14 is provided with an upper extension 30, of reduced inner and outer diameters;—the inner diameter being adapted to fit the reduced diameter post portion 26, while the outer diameter of the sleeve extension 30 being reduced suitably to project into the stationary gear housing 15 and to receive the worm gear 16 which is housed within said stationary housing 15.

The transverse annular shoulder 31 between the two different diameter portions 25 and 26 of the supporting post 10, serves to give vertical support to the sleeve 14 and the tool arm 13, as seen more particularly in Figures 1 and 9. While not expressly shown in Figure 1 of the drawings, yet there is such clearance between the lower end of the bearing sleeve 14 of the tool-carrying arm 13, and the upper surface of the collar or washer 36, as to render the sleeve entirely free of the collar 36, so that there can be no contact nor any resultant binding or clamping of the rotary sleeve 14, regardless of the thrust exerted upon the collar by means of the clamping nut 37, and the entire vertical support of the sleeve 14 and tool-carrying arm 13 is derived through the shoulder 31 on the post and the corresponding offset or shoulder in the upper part of the sleeve 14, as illustrated in Figures 1 and 9.

Below the journal portion 25 of the supporting post 10, the diameter of the supporting post is successively reduced, along the portions 32, 33 and 34, resulting in corresponding annular transverse shoulders. Of these transverse annular shoulders, the shoulder 35 is utilized as a fixed abutment for the washer or collar 36;—said washer or collar 36 being preferably driven tight onto the portion 32 of the supporting post 10. It is against this washer or collar 36, and hence against the shoulder 35, that the axial force of the clamping nut 37 is exerted. Thus, upon the reduced diameter portion 33 of the supporting post 10, one or more spacing or take-up washers are detachably mounted, of suitable aggregate thickness to position the tool arm 13 at the appropriate height corresponding to the particular brake drum in relation to the hub of the wheel. Below the spacer, take-up or adjustment washer or washers 38, the upper conical centering washer 39 is provided, the conical surface of which is adapted to project into the bore 40 of the hub 11 of the wheel and to rest against the annular edge 41 of said bore, thereby to center the supporting post 10. On the lowermost portion 34 of the supporting post 10, the lower conical centering washer 42 is detachably mounted, and below it is the clamping nut 37, threaded onto the lowermost threaded terminal portion 43 of the post 10.

The lower conical centering washer 43 projects into the lower end of the bore 40 of the hub of the wheel, and seats against the lower annular edge 44 of the bore of the hub, thereby further to center the post 10.

Thus, by clamping the supporting post 10 to the hub of the wheel, in the manner indicated in Figure 1, not only is the supporting post 10 rigidly and firmly secured to the hub of the wheel, but it is at the same time centered in true axial relation thereto.

The stationary gear housing 15, mounted stationarily and rigidly on the top of the supporting post 10, is preferably formed of the lower half 45 and the upper half 46, the latter being secured to the post 10 by means of the nut 29 and any other suitable keying means. The lower gear housing member 45 depends from the upper gear housing member 46, and is secured thereto by a suitable number of screws 47, indicated more particularly in Figure 2.

The lower gear housing member 45 is provided with a central opening 48, through which the sleeve extension 30 projects into the interior of the gear housing. A felt washer 49 is provided in the somewhat enlarged lower portion of the hole 40 in the lower housing member 45;—said felt washer serving to minimize the leakage of lubricant from within the gear housing through the central opening 48.

The worm gear 16 is keyed or otherwise fixedly secured to the sleeve extension 30.

In the lower housing member 45 the worm 17 is mounted, in mesh with the worm gear 16;— one end of the worm shaft 50 having its free end extending exteriorly of the gear housing and carrying the pulley 18.

Upon the top of the gear housing 15 the electric motor 21 is suitably mounted and secured by bolts 51. The electric driving motor 21 may be of any suitable type or size sufficent to provide the necessary power. The motor shaft 52 carries the pulley 20 in alignment with the worm shaft pulley 18, and the belt 19 extending over said two pulleys 18 and 20, serves operatively to connect the same. By this means the rotation of the motor shaft 52 is transmitted to the worm 17 and the rotary motion of the latter is in turn transmitted at a right angle to the worm gear 16 and the sleeve 14, thereby causing said sleeve 14 and the tool arm 13 to revolve about an axis at a right angle to the axis of rotation of the motor and worm shaft 50, and also at a speed suitably less than the speed of rotation of the motor.

The tool arm 13 is provided on its leading face (with reference to the direction of rotation indicated by the arrow 54) with a pair of spaced parallel dovetailed guides 55 and the central channel 56 therebetween. The dovetailed guides 55 are adapted to receive and slidably support the longitudinal or radial tool carriage 57, while the longitudinal channel 56 is adapted to accommodate the longitudinal carriage feed or adjustment screw 58;—said feed screw 58 having its outer end rotatably anchored in the end block 59 which is secured to the free end of the tool arm 13.

The longitudinal carriage 57 is provided with a nut which is in threaded engagement with the feed screw 56. The outer end of the feed screw 58 is provided with a square shank 61 for the reception of any suitable square socket feed handle (not shown) or any suitable wrench, whereby the longitudinal carriage 57 may be moved inwardly or outwardly in a radial direction, thereby to set the cutter 24 to the desired diametrical dimension. A suitably graduated collar 63 may also be provided on the feed screw 58, for the purpose of calibrating the longitudinal or radial adjusting movement or feed movement of the longitudinal carriage 57 in relation to the rotation of the feed screw 58.

The longitudinal tool carriage 57 is in turn provided with a pair of spaced parallel vertical dovetailed guides 64, upon which is slidably mounted the vertical or transverse tool carriage 65. Intermediate the pair of spaced parallel dovetailed guides 64 is a channel 66, which accommodates the vertical feed screw 67. The feed screw 67 is in threaded engagement with a feed nut which is anchored to the vertical carriage 65 by an anchoring pin or stud 69 extending into and through a corresponding hole in the vertical carriage. The feed screw 67 is provided at its upper end with a bare or threadless portion 70, onto which the feed nut is adapted to run, thereby automatically to define the limit of upward vertical travel of the vertical carriage 65. The vertical feed screw 67 is suitably journalled at its upper end in the terminal block 71. Immediately above the bare or threadless portion 70 of the feed screw 67, a spiral gear 72 is provided, through which the feed screw 67 is rotated. Above the tool arm 13, and extending parallel thereto in operative alignment with the spiral gear 72, a feed shaft 73 is provided, with its inner end 74 journalled in a suitable bearing opening 75 in the body of the sleeve 14 and with the outer end 76 thereof journalled in the terminal block 59 and rotatably anchored therein against axial movement by means of a pair of suitable collars 77 and 78.

The feed shaft 73 is provided with a longitudinal keyway 79. The feed shaft 73 extends through corresponding openings in a pair of lugs 80 forming part of the longitudinal carriage 57. A spiral gear 81 is slidably mounted upon the feed shaft 73 and keyed thereto against relative rotation with the respect to the shaft 73, by means of a key carried by the spiral gear 81 and slidable in the key-way 79. The spiral gear 81 is disposed between the pair of lugs 80, which serve to retain said spiral gear constantly in mesh with the spiral gear 72 affixed to the vertical feed screw 67. Thus the rotary movement of the feed shaft 73 will effect a corresponding rotation of the vertical feed screw 67 and a corresponding movement of the vertical carriage 65.

The periodic, intermittent rotary movement of the feed shaft 73 is effected through the feed ratchet mechanism illustrated particularly in Figures 4 to 7 inclusive. Thus a ratchet wheel 82 is suitably affixed to the feed shaft 73, near the inner end 74 thereof, by any suitable means such as the paper pin 83 extending through the hub of the ratchet gear 82 and through the shaft 73, and surrounding said ratchet wheel or ratchet gear 82, and freely journalled on the feed shaft 73 a pawl housing 84 is provided, adapted to be oscillated to and fro, within suitable limiting angles, by a lever and link mechanism, to be described more in detail hereinafter.

Thus the pawl housing 84 has slidably mounted within it a spring-pressed pawl, detent or plunger 85, having its operative end 86 shaped corresponding to the shape of the teeth 87 of the ratchet gear 82, so that when the plunger, detent or pawl 85 is resiliently urged into contact with the toothed periphery of the ratchet gear or wheel 82, it will operatively engage said toothed periphery in one direction, but will not so engage the same in the opposite direction. Any suitable helical compression spring 88 may be provided for resiliently urging the plunger or detent 85 in the direction of the toothed periphery of the ratchet wheel 82, while a suitable exterior thumb-knob 89 may be provided on the exteriorly projecting portion of the plunger stem 90, for manually withdrawing the plunger or detent 85 from operative relation to the toothed periphery of the ratchet wheel 82. A retainer pin 91 is extended through the stem 90 of the detent 85, and a corresponding slot 92 is provided in the housing 84, for receiving the pin 91.

When it is desired to retain the detent 85 out of operative engagement with the toothed periphery of the ratchet gear 82, the same is withdrawn by means of the thumb-knob 89 and rotated until the retainer pin 91 extends transversely of the slot 92;—permitting said retainer pin 91 to rest upon the terminal surface 93 of the housing 84. When the detent 85 is thus placed in an inoperative position, the feed shaft 73 may be operated independently of the automatic ratchet feed mechanism, by means of a manual handle or wrench applied to the outer square shank terminal portion 94 of the said feed shaft 73.

The intermittent angular oscillation of the detent or pawl housing 84 is effected by means of the pivoted arm or lever 95 which is pivoted to the sleeve 14 by means of the pivot screw 96; the link 97, which is pivotally secured at one end to the free end of the lever 95 by means of the pivot screw 98 and which is pivotally secured at its other end to the detent housing 84 by means of the pivot screw 99, and the abutment 100 which is fixedly secured to the stationary gear housing 16, as shown particularly in Figure 1.

The fixed abutment 100 is in operative alignment with the vertical contact surface 101 of the pivotal lever or arm 95, so that as the sleeve 14 and the tool arm 13 revolve about the stationary supporting post 10, and beneath the stationary gear housing 16, the contact surface 101 of the lever 95 will encounter the stationary or fixed abutment 100 and will be depressed or deflected thereby in the direction of the arrow 102 (Figure 4). This deflection of the lever 95, with each revolution of the sleeve and tool arm 14 and 13 respectively, causes a corresponding periodic deflection or angular oscillation of the detent housing 84 and hence of the detent 85. Any suitable spring member (not shown) is used for returning the lever 101 to its initial position, after each deflection by the member 100, in the conventional manner in which ratchet pawls are customarily returned by spring. If the detent 85 is in operative relation to the toothed periphery of the ratchet wheel or ratchet gear 82, shown in Figures 4, 5, 6, and 7, the periodic deflection or oscillation thus produced will cause a corresponding intermittent rotation of the feed shaft 73 in the same direction. Through the spiral gears 80 and 72, this periodic and intermittent rotation of the feed shaft 73 causes a corresponding intermittent and periodic upward movement of the vertical carriage 65. By this means the tool 24 carried by the vertical carriage 65 is gradually moved or fed in an upward direction, until either the operator stops the machine after the tool 24 has run over the entire brake surface or until the feed nut which is operated by the vertical feed screw 67, runs onto the blank or bare portion 70 of said vertical feed screw 67.

By this means, the tool 24 is fed transversely of the cylindrical brake drum 22, in an upward direction, that is from the innermost part of the brake drum towards the outer free edge 103 thereof. By thus feeding the tool towards the free edge 103 of the brake drum 22, and by providing a suitable threadless portion 70 upon the vertical feed screw 67, all danger of the tool 24 overrunning or cutting into portions of the brake drum other than the braking surface, is entirely eliminated. Thus the tool is started at the point 104, and is fed upward. It the tool 24 runs off the brake drum edge 103, and continues to be moved upwardly by the continued operation of the machine, no harm can be done either to the brake being trued, or to the machine, since the tool 24 merely runs off the free edge 103 of the brake drum and the vertical carriage 65 ceases to move upwardly when the feed nut runs onto the blank or threadless portion 70 of the feed screw 67.

In order to vary the rate of movement of the vertical carriage 65, a latch member 105 is pivotally secured to the portion 106 of the sleeve 14, by means of the pivot pin 107. A stop pin or abutment 108 is affixed to the detent housing 84, in operative alignment with the latch 105. When the latch 105 is in the inoperative position shown particularly in Figure 7, the detent housing 84 is afforded its maximum freedom of angular oscillation. In this condition, the oscillation will cause the detent 85 to transverse three teeth of the toothed ratchet wheel 82, thereby causing the tool to be fed at a corresponding rate to provide a coarse cut. When the latch 105 is deflected about its pivot 107 in the direction of the arrow 109, the notched surface 110 of said latch 105 is placed into operative alignment with the pin or abutment 108 carried by the detent housing 84. This engagement causes the detent housing 84 to be retained in a partially deflected or a pre-deflected condition, so that when the stationary abutment 100 engages the contact surface 101 of the lever 95, it will deflect said lever 95 and hence will oscillate the detent housing 84 only one-third of its normal oscillation, so that the detent 85 will traverse the distance of merely one tooth. This produces the fine feed which may be required for finishing the brake drum surface.

The vertical carriage 65 carries near its lower end any suitable tool post 111, including the clamping ring 112 and the nut 113. The corresponding lower portion of the vertical carriage 65 is in turn provided with a pair of oppositely inclined channels or slots 114, adapted to receive and seat the tool 24, at opposite inclinations, so as to position said tool for turning the internal and external surfaces respectively of a brake drum;— depending on whether the brake drum surface is external or internal.

In order to insure against relative rotation between the collar 36 and the take-up or adjustment washers 38, and the conical centering washer or member 39, a dowel-pin 115 is provided in the base of the conical centering member 39, and a corresponding hole 116 in the opposed face of the spacing washer 38. The opposite face of the adjustment washer 38 is in turn provided with a corresponding dowel-pin 117, which fits into a corresponding hole in the collar 36. By this means, the successive washers may be interlocked against relative rotation, thereby further insuring against the rotation of the centering post or supporting post 10 with respect to the hub 11 of the wheel 12.

In actual operation of the machine of my present invention, the automobile wheel 12, including the tire 23 if desired, is mounted upon any suitable support, and the machine then attached to the hub of the wheel as indicated particularly in Figure 1. The tool 24 is then adjusted to the desired diameter by means of the longitudinal feed screw 58, and the tool started from inside, that is part of the innermost from the effective brake surface. When the tool 24 runs off the brake surface, the operator may stop the machine and remove the same from the wheel. If desired, several successive cuts may be taken to acquire the desired effect.

In the modification of my invention shown in Figure 9, the post 10, instead of being provided with a series of "take-up" or adjustment washers 38, of varying axial thicknesses, for obtaining the desired vertical adjustment of the entire machine with respect to the brake drum, is instead provided with an accurately turned screw thread 120, which is preferably a square thread and upon this square thread 120, a single screw-threaded adjustment collar 121 is threadedly mounted. The exterior periphery of the adjustment collar 121 is preferably knurled so as to facilitate its manual manipulation or turning. The conical centering member 122, in this modification of my invention, is fitted neatly onto the outer diameter of the square screw thread 120, so as to enable it to give the centering and supporting post 10 a true axial alignment.

The lower conical centering member 123, in this modification of my invention, is the same as the lower conical centering member 42 in the modification of my invention shown particularly in Figure 1. The lock nut 124 in this modified construction is screw-threaded onto the screw-threaded end 125 of the centering and supporting post 10 with a left-handed screw thread, or a screw thread opposed to the square screw thread 120, so that the two screw threads will work in opposition to each other, as indicated particularly in Figure 9. The lock nut 124 is likewise preferably knurled to facilitate manual handling.

In this modified embodiment of my invention, the lower portion 126 of the centering post 10 is extended through the hub of the wheel in a manner similar to that shown in Figure 1, and the adjustment nut 121 is then turned up or down until the desired vertical level or height is obtained. Thereafter, the lock nut 124 is tightened up and the machine is so arranged that the torque exerted upon the centering and supporting post 10 by the cutting tool, will tend to tighten the screw threads, while an opposite torque, (which may be exerted manually when demounting the machine) will loosen the screw threads. By this means, a quicker adjustment is obtainable with respect to the hub of the wheel.

In this modified embodiment of my invention also, the longitudinal carriage feed or adjustment screw 58 is extended tangentially through the casting which comprises the sleeve 14 and the tool arm 13, and to the end of the longitudinal feed screw 58 thus extended through, a knurled knob 127 is secured, whereby the feed screw 58 may be operated manually to secure the desired radial or longitudinal adjustment of the tool without manipulation at the outer end of the screw, as in the modification shown in Figure 1. Thus, by this means, the rotation of the screw 58 may be effected from a point close to the center of rotation rather than a point at a considerable distance from the center of rotation, so that the radial or longitudinal adjustment of the tool may be effected more readily and with greater ease while the tool arm is rotating slowly.

In the modification of my invention shown in Figure 9, I also provide a vertical motor 128, in place of the horizontal motor 21 used in the modification illustrated particularly in Figure 1. The advantages of this modification are primarily the elimination of the belt drive 19. Thus, in this modification of my invention, an internal ring gear 129 is provided within the stationary gear housing 15, carried by any suitable annular ring gear supporting housing or member 130, which is keyed to the upper extension 30 of the sleeve 14 in much the same manner as the worm gear 16 is keyed to said upper extension 30 in the modification shown in Figure 1. A driving pinion 131 is in operative mesh with the internal ring gear 129 and is adapted to drive the same and hence the sleeve 14 and tool arm 13. The driving pinion 131 may be affixed or keyed directly to the vertical motor shaft, or it may be affixed or keyed to a reduced speed spindle 132, of any suitable reduction gear mechanism 133 intermediate the reduced speed spindle 132 and the motor 128. Thus, depending entirely on the speed of the motor and the desired speed of rotation of the arm 13 and the ratio between the driving pinion 131 and the driven gear 129, the driving pinion 131 may be directly upon the shaft of the motor or it may be carried upon the reduced speed spindle of any suitable or conventional gear reduction box, the details of which are not shown in the drawings. Thus, if desired, a motor 128 having a reduction gear box 133 permanently built onto one end thereof, may be used in the manner shown in Figure 9 by mounting said motor 128 vertically upon a suitable supporting or spacer frame 134. The supporting or spacer frame 134 may be in the form of a cylindrical or tubular member, the lower end of which rests upon and is secured to the stationary gear housing 15 and to the upper end of which is secured the motor frame by means of the screws 135. The stationary gear housing 15 may be generally similar to the stationary gear housing forming a part of the modified construction shown in Figure 1, except for the changes made to accommodate the internal gear 129 and the pinion 131 and the vertical motor. The stationary gear housing 15 in this modified construction is likewise formed of two halves 136 and 137 respectively, corresponding to the two halves 45 and 46 in Figure 1. The stationary gear housing 15 is similarly keyed to the centering and supporting post 10 by means of a suitable key 138 and is locked by means of a bolt or screw 139.

I am aware that my invention may be embodied in other specific forms without departing from the spirit or essential attributes thereof, and I therefore desire the present embodiments to be considered in all respects as illustrative and not restrictive, reference being had to the appended claims rather than to the foregoing description to indicate the scope of the invention.

Having thus described my invention, what I hereby claim as new and desire to secure by Letters Patent is:—

1. A portable brake drum truing machine adapted for attachment to the hub of the wheel carrying the brake drum, including a centering and supporting post adapted to be detachably secured to the hub of the wheel in axial alignment therewith and in rigid and non-rotating relation thereto, a tool carrying sleeve and arm rotatably mounted upon said supporting and centering post, a stationary housing stationarily mounted on the top of said supporting and centering post, an electric motor carried by said housing, a gear affixed to said sleeve, means in mesh with said gear and housed within said housing, and operatively connected with said electric motor to be driven thereby, for imparting a reduced speed rotary motion to said gear, sleeve and tool arm, a carriage slidably mounted upon said tool arm for longitudinal movement with respect thereto, a transverse carriage slidably mounted upon said longitudinal carriage and adapted to support a tool in operative relation to said brake drum and adapted for a tool-feeding movement with respect to said tool arm and transversely thereof, screw-threaded means for imparting a feeding motion to said transverse carriage in timed relation to the rotary motion of said tool arm, and means extending along said tool arm for automatically actuating said screw-threaded transverse carriage feeding means, as a result of the rotation of the tool arm.

2. A portable brake drum truing machine adapted for attachment to the hub of the wheel carrying the brake drum, including a centering and supporting post adapted to be detachably secured to the hub of the wheel in axial alignment therewith and in rigid and non-rotating relation thereto, a tool carrying sleeve and arm rotatably mounted upon said supporting and centering post, a stationary housing stationarily mounted on the top of said supporting and centering post, an electric motor carried by said housing, a gear affixed to said sleeve, means in mesh with said gear and housed within said housing, and operatively connected with said electric motor to be driven thereby, for imparting a reduced speed rotary motion to said gear, sleeve and tool arm, a tool carriage carried by said tool arm, adapted to support a tool in operative relation to said brake drum and adapted for a tool-feeding movement with respect to said tool arm and transversely thereof, screw-threaded means for imparting a feeding motion to said tool carriage in timed relation to the rotary motion of said tool arm, and a ratchet mechanism, including a ratchet shaft extending along the tool arm and operatively connected to said screw-threaded means and a ratchet wheel carried by said ratchet shaft near the inner end thereof, and a detent operated by a stationary abutment carried by the centering and supporting post, for imparting an intermittent motion to said screw-threaded means.

3. A portable brake drum truing machine adapted for attachment to the hub of the wheel carrying the brake drum, including a centering and supporting post adapted to be detachably secured to the hub of the wheel in axial alignment therewith and in rigid and non-rotating relation thereto, a tool carrying sleeve and arm rotatably mounted upon said supporting and centering post, a stationary housing stationarily mounted on the top of said supporting and centering post, an electric motor carried by said housing, a gear affixed to said sleeve, means in mesh with said gear and housed within said housing, and operatively connected with said electric motor to be driven thereby, for imparting a reduced speed rotary motion to said gear, sleeve and tool arm, a carriage slidably mounted upon said tool arm for longitudinal movement with respect thereto, a transverse carriage slidably mounted upon said longitudinal carriage and adapted to support a tool in operative relation to said brake drum and adapted for a tool-feeding movement with respect to said tool arm and transversely thereof, screw-threaded means for imparting a feeding motion to said transverse carriage in timed relation to the rotary motion of said tool arm, and means for automatically limiting the travel of said transverse carriage without the necessity of stopping the machine.

4. A portable brake drum truing machine adapted for attachment to the hub of the wheel carrying the brake drum, including a centering and supporting post adapted to be detachably secured to the hub of the wheel in axial alignment therewith and in rigid and non-rotating relation thereto, a tool carrying sleeve and arm rotatably mounted upon said supporting and centering post, a stationary housing stationarily mounted on the top of said supporting and centering post, an electric motor carried by said housing, a gear affixed to said sleeve, means in mesh with said gear and housed within said housing, and operatively connected with said electric motor to be driven thereby, for imparting a reduced speed rotary motion to said gear, sleeve and tool arm, a tool carried by said tool arm, means for positioning said tool at any desired radial distance from the axis of the supporting post, and the axis of rotation of the tool carrying sleeve and arm, within the radial limits of the machine, means for feeding the tool in a direction generally parallel to said axis of rotation, and rotary means extending along said tool arm and having an operative connection with said stationary housing for automatically actuating said axial tool feeding means in all radial settings of the tool, as a result of the rotation of the tool arm.

5. A portable brake drum truing machine adapted for attachment to the hub of the wheel carrying the brake drum, including a centering and supporting post adapted to be detachably secured to the hub of the wheel in axial alignment therewith and in rigid and non-rotating relation thereto, a tool carrying sleeve and arm rotatably mounted upon said supporting and centering post, a stationary housing stationarily mounted on the top of said supporting and centering post, an electric motor carried by said housing, a gear affixed to said sleeve, means in mesh with said gear and housed within said housing, and operatively connected with said electric motor to be driven thereby, for imparting a reduced speed rotary motion to said gear, sleeve and tool arm, a tool carriage carried by said tool arm, adapted to support a tool in operative relation to said brake drum and adapted for a tool-feeding movement with respect to said tool arm and transversely thereof, means for positioning said tool carriage at any desired radial distance from the axis of the supporting post and the axis of rotation of the tool carrying sleeve and arm, within the radial limits of the machine, and rotary means extending along said tool arm and having an operative connection with said stationary housing for automatically feeding said tool carriage transversely of the tool arm as a result of the rotation of the latter.

6. A portable brake drum truing machine adapted for attachment to the hub of the wheel carrying the brake drum, including a centering and supporting post adapted to be detachably secured to the hub of the wheel in axial alignment therewith and in rigid and non-rotating relation thereto, a tool carrying sleeve and arm rotatably mounted upon said supporting and centering post, a stationary housing stationarily mounted on the top of said supporting and centering post, an electric motor carried by said housing, a gear affixed to said sleeve, means in mesh with said gear and housed within said housing, and operatively connected with said electric motor to be driven thereby, for imparting a reduced speed rotary motion to said gear, sleeve and tool arm, a tool carriage carried by said tool arm, adapted to support a tool in operative relation to said brake drum and adapted for a tool-feeding movement with respect to said tool arm and transversely thereof, screw threaded means for imparting a feeding motion to said tool carriage in timed relation to the rotary motion of said tool arm, and rotary means extending along said tool arm and having an operative connection with said stationary housing for automatically actuating said screw-threaded means as a result of the rotation of the tool arm.

7. A portable brake drum truing machine adapted for attachment to the hub of the wheel carrying the brake drum, including a centering and supporting post adapted to be detachably secured to the hub of the wheel in axial alignment therewith and in rigid and non-rotating relation thereto, a tool carrying sleeve and arm rotatably mounted upon said supporting and centering post, a stationary housing stationarily mounted on the top of said supporting and centering post, an electric motor carried by said housing, a gear affixed to said sleeve, means in mesh with said gear and housed within said housing, and operatively connected with said electric motor to be driven thereby, for imparting a reduced speed rotary motion to said gear, sleeve and tool arm, a carriage slidably mounted upon said tool arm for longitudinal movement with respect thereto, a transverse carriage slidably mounted upon said longitudinal carriage and adapted to support a tool in operative relation to said brake drum and adapted for a tool-feeding movement with respect to said tool arm and transversely thereof, and rotary means extending along said tool arm and having an operative connection with said stationary housing for automatically feeding said transverse carriage in a direction transversely of the tool arm as a result of the rotation of the latter.

8. A centering device for brake drum truing machines, including a centering post adapted to be extended through the hub of a wheel and to be detachably affixed thereto and in stationary relation thereto, said centering post having opposite screw-threaded portions adapted to be disposed on opposite sides of the hub of the wheel, means associated with each of said screw-threaded portions and in threaded engagement therewith, and tapering centering means surrounding said centering post, and associated with each of said screw-threaded means, and disposed intermediate the two screw-threaded means.

9. A centering device for brake drum truing machines, including a centering post adapted to be extended through the hub of a wheel and to be detachably affixed thereto and in stationary relation thereto, a driven tool-carrying arm rotatably mounted upon said centering post, and having a tool adapted for turning the brake drum of the wheel through the hub of which the centering post is extended, said centering post having a screw-threaded terminal portion and threaded locking means threadedly associated therewith;—the direction of the thread of said threaded terminal portion and said threaded means associated therewith being such as to cause said screw-threaded means to be moved towards the opposite end of the centering post when rotated in the same direction as the rotation of the tool-carrying arm.

10. A portable brake drum truing machine adapted for attachment to the hub of the wheel carrying the brake drum, including a centering and supporting post adapted to be detachably secured to the hub of the wheel in axial alignment therewith and in rigid and non-rotating relation thereto, a tool-carrying sleeve and arm rotatably mounted upon said supporting and centering post, a support stationarily mounted on the top of said supporting and centering post, an electric motor carried by said support, a gear affixed to said sleeve, means in mesh with said gear and carried on said support, and operatively connected with said electric motor to be driven thereby, for imparting a reduced speed rotary motion to said gear, sleeve and tool arm, a tool carried by said tool arm, means for positioning said tool at any desired radial distance from the axis of the supporting post, and the axis of rotation of the tool-carrying sleeve and arm, within the radial limits of the machine, means for feeding the tool in a direction generally parallel to said axis of rotation, and rotary means extending along said tool arm and having an operative connection with said stationary support for automatically actuating said axial tool feeding means in all radial settings of the tool, as a result of the rotation of the tool arm.

WALTER H. MYERS.